(12) United States Patent
Sundquist et al.

(10) Patent No.: US 10,814,602 B2
(45) Date of Patent: Oct. 27, 2020

(54) METHOD OF PRODUCING CORED COMPOSITE PARTS

(71) Applicant: The Boeing Company, Chicago, IL (US)

(72) Inventors: David J. Sundquist, O'Fallon, MO (US); Steven J. Burpo, St. Charles, MO (US); Trevor Howard, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 325 days.

(21) Appl. No.: 15/264,675

(22) Filed: Sep. 14, 2016

(65) Prior Publication Data
US 2018/0072432 A1    Mar. 15, 2018

(51) Int. Cl.
| | | |
|---|---|---|
| *B32B 3/24* | (2006.01) | |
| *B32B 38/04* | (2006.01) | |
| *B32B 3/26* | (2006.01) | |
| *B32B 3/28* | (2006.01) | |
| *B32B 38/18* | (2006.01) | |
| *B29C 70/34* | (2006.01) | |
| *B29C 70/54* | (2006.01) | |
| *B29C 70/86* | (2006.01) | |
| *B64F 5/10* | (2017.01) | |

(52) U.S. Cl.
CPC ............ *B32B 38/04* (2013.01); *B29C 70/342* (2013.01); *B29C 70/545* (2013.01); *B29C 70/86* (2013.01); *B29C 70/865* (2013.01); *B32B 3/266* (2013.01); *B32B 3/28* (2013.01); *B32B 38/1808* (2013.01); *B64F 5/10* (2017.01); *B32B 2038/045* (2013.01); *B32B 2605/18* (2013.01)

(58) Field of Classification Search
CPC ........................................................ B32B 3/266
USPC ......................................... 428/116, 156, 136
See application file for complete search history.

(56) References Cited

U.S. PATENT DOCUMENTS

| | | | | |
|---|---|---|---|---|
| 4,344,995 A * | 8/1982 | Hammer | ................. | B29C 70/08 |
| | | | | 428/61 |
| 6,780,488 B2 * | 8/2004 | Holemans | ............. | B29C 70/086 |
| | | | | 156/242 |

(Continued)

FOREIGN PATENT DOCUMENTS

| | | |
|---|---|---|
| EP | 1308266 | 5/2003 |
| EP | 3015258 | 5/2016 |
| WO | 0216116 | 2/2002 |

OTHER PUBLICATIONS

European Search Report, European Application No. 17188364, dated Jan. 29, 2018.

(Continued)

*Primary Examiner* — William P Watkins, III
(74) *Attorney, Agent, or Firm* — Perman & Green LLP

(57) ABSTRACT

A composite structure includes a base structure, a core disposed on the base structure, the core having a non-uniform contour relative to the base structure, a layered cover material disposed on the base structure covering the core, the layered cover material conforming to the non-uniform contour of the core and having at least one overlay ply, each of the at least one overlay ply having at least one slit cut through fibers of the respective overlay ply, and at least one cover ply having a shape that spans the at least one slit, and being configured to transfer a load across the at least one slit.

19 Claims, 10 Drawing Sheets

(56) References Cited

U.S. PATENT DOCUMENTS

| | | | |
|---|---|---|---|
| 8,052,826 B2 | 11/2011 | Burpo et al. | |
| 8,663,776 B2 | 3/2014 | Goering et al. | |
| 8,969,223 B2 | 3/2015 | Goering et al. | |
| 2006/0105142 A1* | 5/2006 | Shiga | C09J 7/22 428/136 |
| 2008/0182054 A1* | 7/2008 | Ridges | B29C 70/30 428/35.2 |
| 2010/0247838 A1 | 9/2010 | Burpo et al. | |
| 2013/0344295 A1* | 12/2013 | Bremmer | B32B 7/02 428/174 |

OTHER PUBLICATIONS

Black, Sara "Composites: Aligned Discontinuous Fibers Come of Age". Gardener Business Media Inc. 2016. http://www.compositesworld.com/articles.

Simmons, Amber R. "An Analysis of the Properties of Carbon Fiber Aligned Discontinuous Prepreg Tape". Pepin Associates, Inc.; Society for the Advancement of Material and Processing Engineering; 2012.

Campbell, et al. "Hybrid Thermoplastic Composite Ballistic Helmet Fabrication Study". Fiberforge Corporation; Society for the Advancement of Material and Processing Engineering; 2008.

Xue, et al. "Progressive Failure Analysis of the Fiber Metal Laminates Based on Chopped Carbon Fiber Strands". Sage Publications; Journal of Reinforced Plastics and Composites, vol. 34, Issue 5, 2015, pp. 364-376.

Grenestdt, Joachim. "Stretchable Unidirectional Fiber Reinforcement" ARO Grant W911NF-08-1-0386; Department of Mechanical Engineering and Mechanics, Nov. 2009.

"Aviation Maintenance Handbook; Airframe" US Department of Transportation; Federal Aviation Administration Flight Standards Service, vol. 1, Chapter 7, 2012.

\* cited by examiner

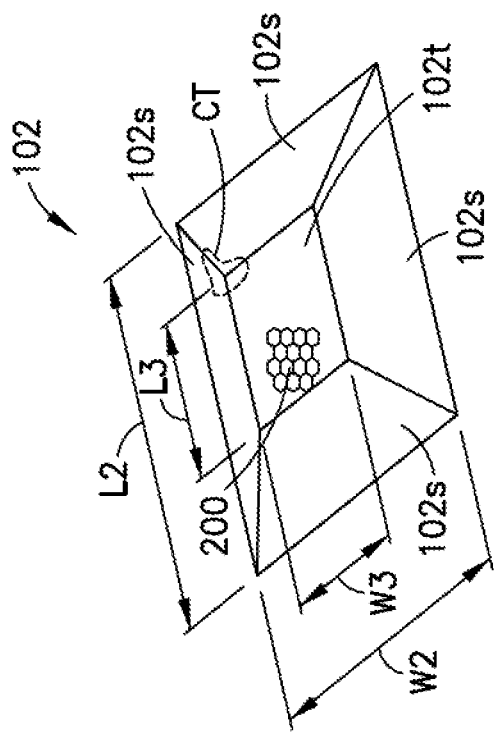
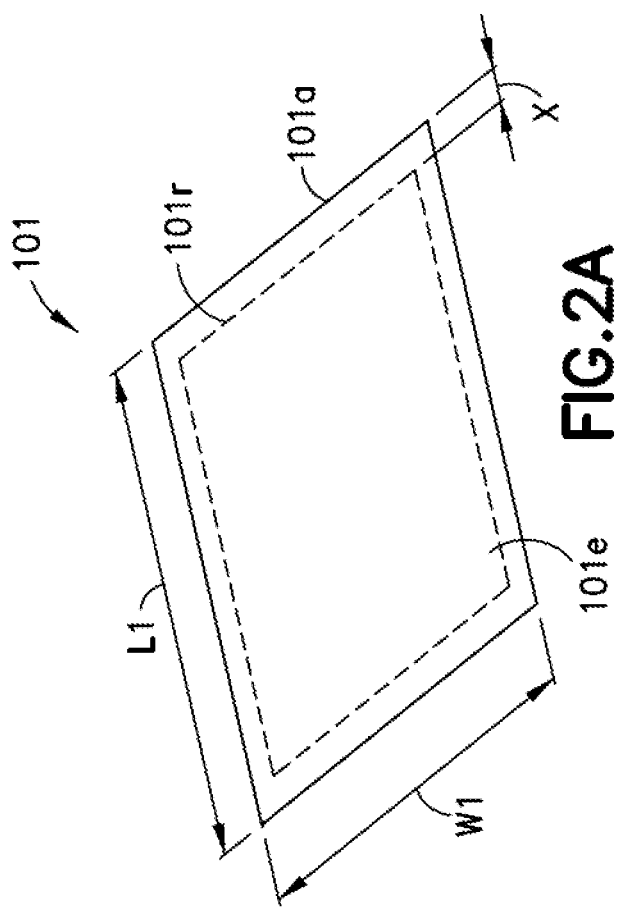
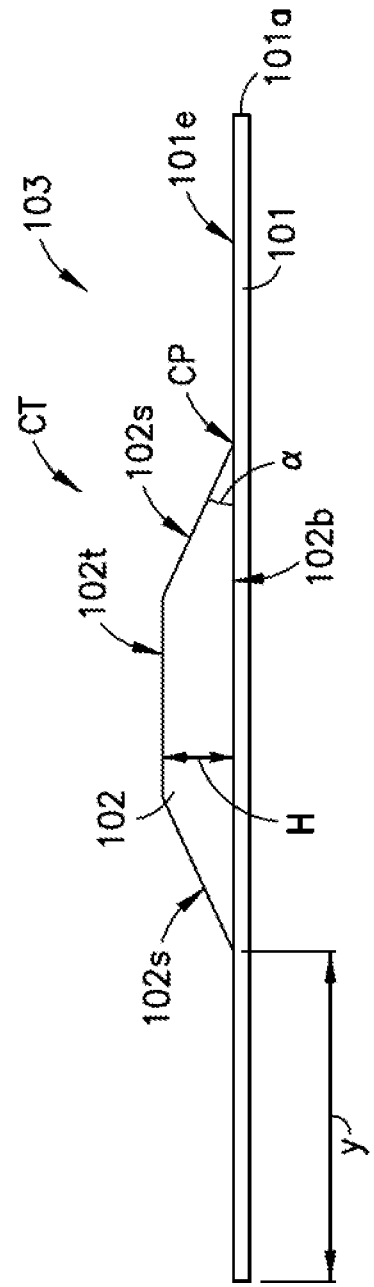

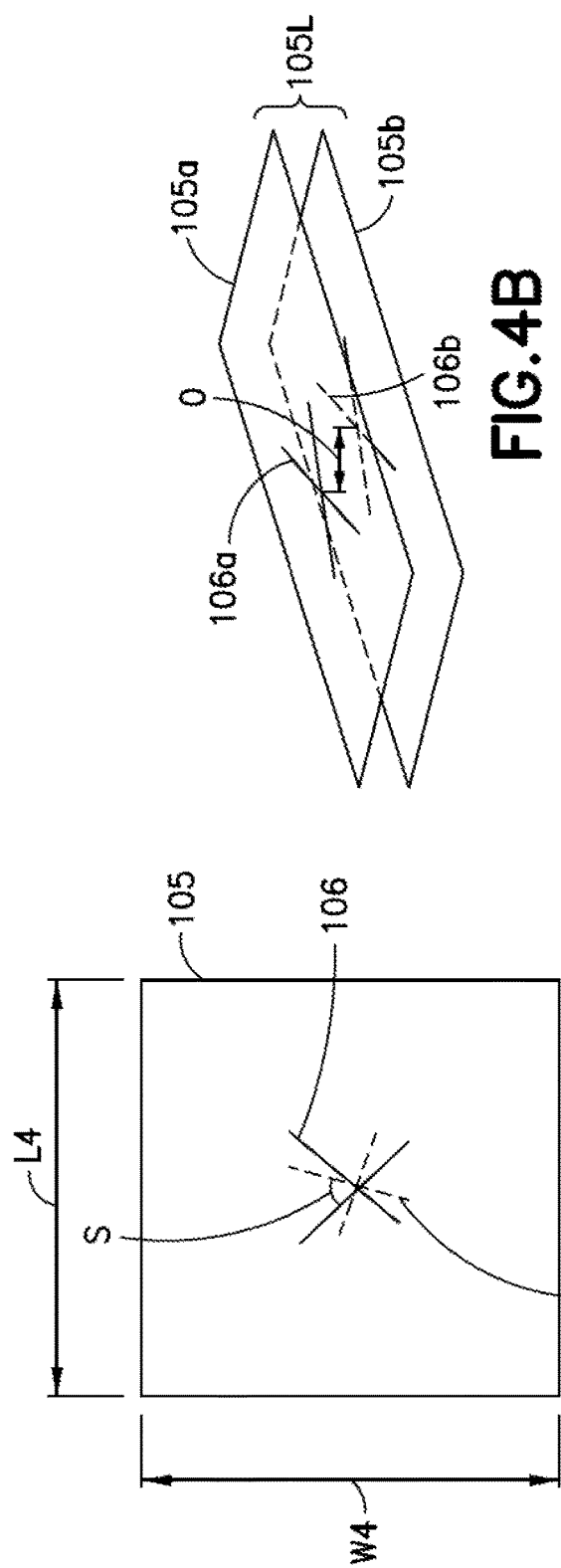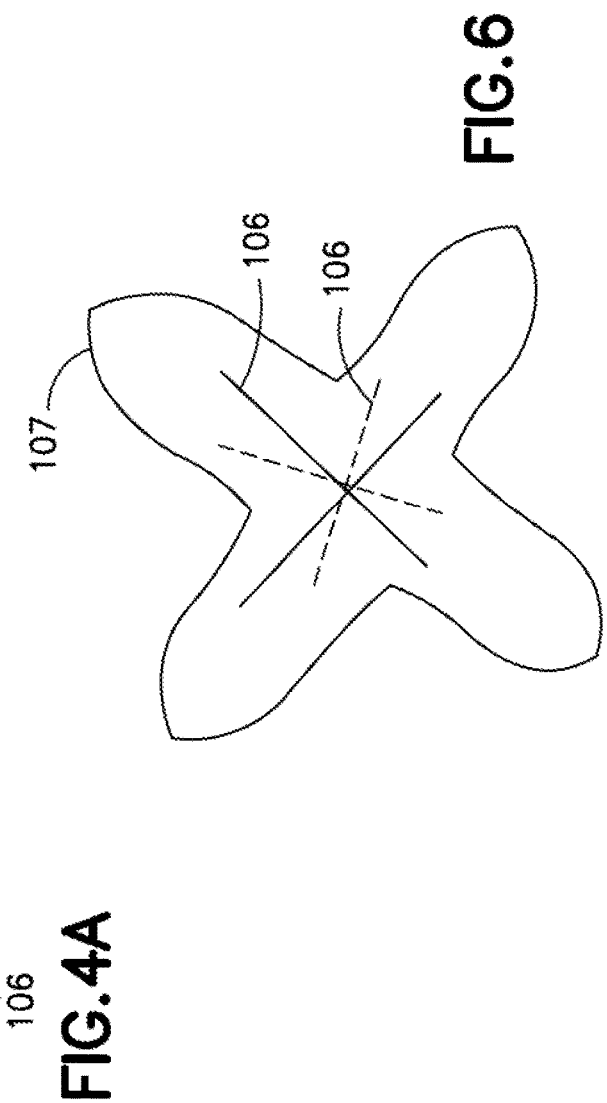

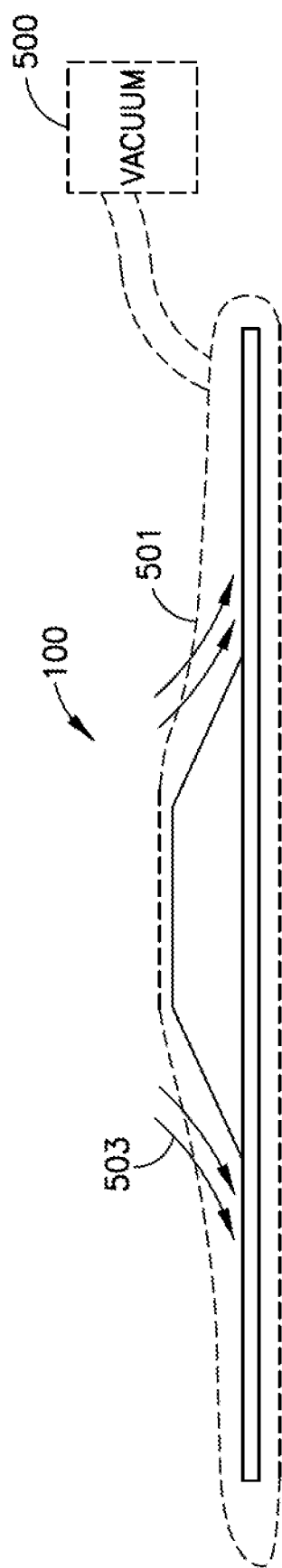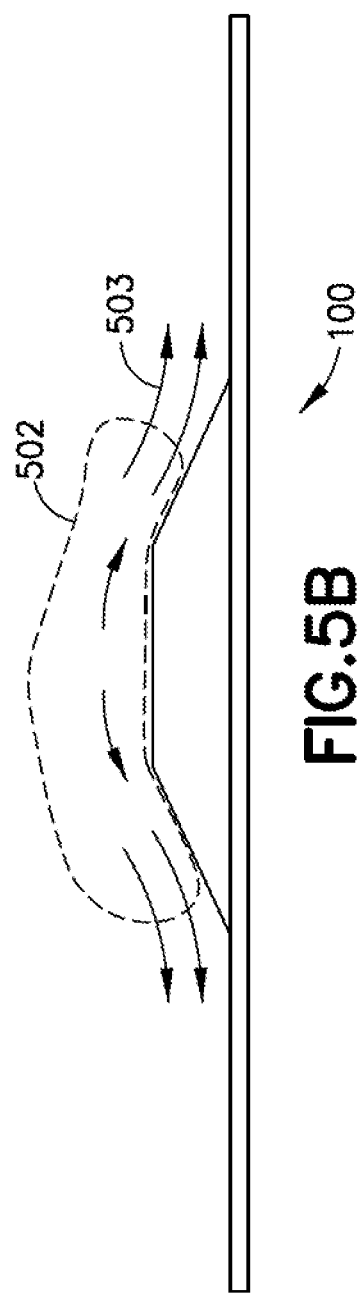
FIG.5A
FIG.5B

US 10,814,602 B2

METHOD OF PRODUCING CORED COMPOSITE PARTS

BACKGROUND

1. Field

The exemplary embodiments generally relate to composite parts and in particular to a method of producing a cored composite part.

2. Brief Description of Related Developments

One example of a composite part incorporating a cored composite is a wing of an aircraft. The wing of the aircraft generally has relatively flat or gently contoured plies defining an outer mold line (OML) of the wing. Cores are positioned on the plies defining the OML between structural members of the wing of the aircraft (e.g., ribs or spars). Inner mold line (IML) plies are then formed over the cores to cover the cores and the plies defining the OML, which defines the IML of the aircraft wing. Existing methods of forming the IML plies over the cores are generally through manual application of the IML plies. When the IML plies are formed over the cores, technicians must carefully sculpt the IML plies to the shape of the cores, placing the IML plies and slowly working the IML plies around the core bay so that no wrinkles are formed. The process of forming the IML plies over the cores is time consuming, laborious and challenging to accomplish without creating wrinkles in the IML plies or damaging the cores. The cores are susceptible to deforming by compressive forces as the technicians work out any wrinkles formed during placement of the IML plies. Accordingly, the technicians laying the IML plies must be careful not to crush or otherwise alter the cores. If a core is damaged, the composite part must be reworked adding extra time and cost to the part.

SUMMARY

The following is a non-exhaustive list of examples, which may or may not be claimed, of the subject matter according to the present disclosure.

One example of the subject matter according to the present disclosure relates to a composite structure including a base structure, a core disposed on the base structure, the core having a non-uniform contour relative to the base structure, a layered cover material disposed on the base structure covering the core, the layered cover material conforming to the non-uniform contour of the core and having at least one overlay ply, each of the at least one overlay ply having at least one slit cut through fibers of the respective overlay ply, and at least one cover ply having a shape that spans the at least one slit, and being configured to transfer a load across the at least one slit.

Another example of the subject matter according to the present disclosure relates to a method for laying up a composite structure, the method including cutting at least one slit through respective fibers of at least one overlay ply of a layered cover material, and conforming the layered cover material to a non-uniform contour of a core disposed on a base structure by laying the at least one overlay ply over the base structure and the core disposed on a base structure so as to cover the core, and laying at least one cover ply, of the layered cover material, over the at least one overlay ply so that a shape of the at least one cover ply spans the at least one slit and transfers a load across the at least one slit.

Still another example of the subject matter according to the present disclosure relates to a composite structure including a base structure, a core disposed on the base structure, the core having a non-uniform contour relative to the base structure, a layered cover material disposed on the base structure covering the core, the layered cover material conforming to the non-uniform contour of the core and having a layered stack of overlay plies, each overlay ply in the layered stack having at least one slit cut through fibers of the respective overlay ply, and at least one cover ply in the layered stack of overlay plies, each cover ply having a shape that spans the at least one slit, and being configured to transfer a load across the at least one slit.

BRIEF DESCRIPTION OF THE DRAWINGS

Figure 1:
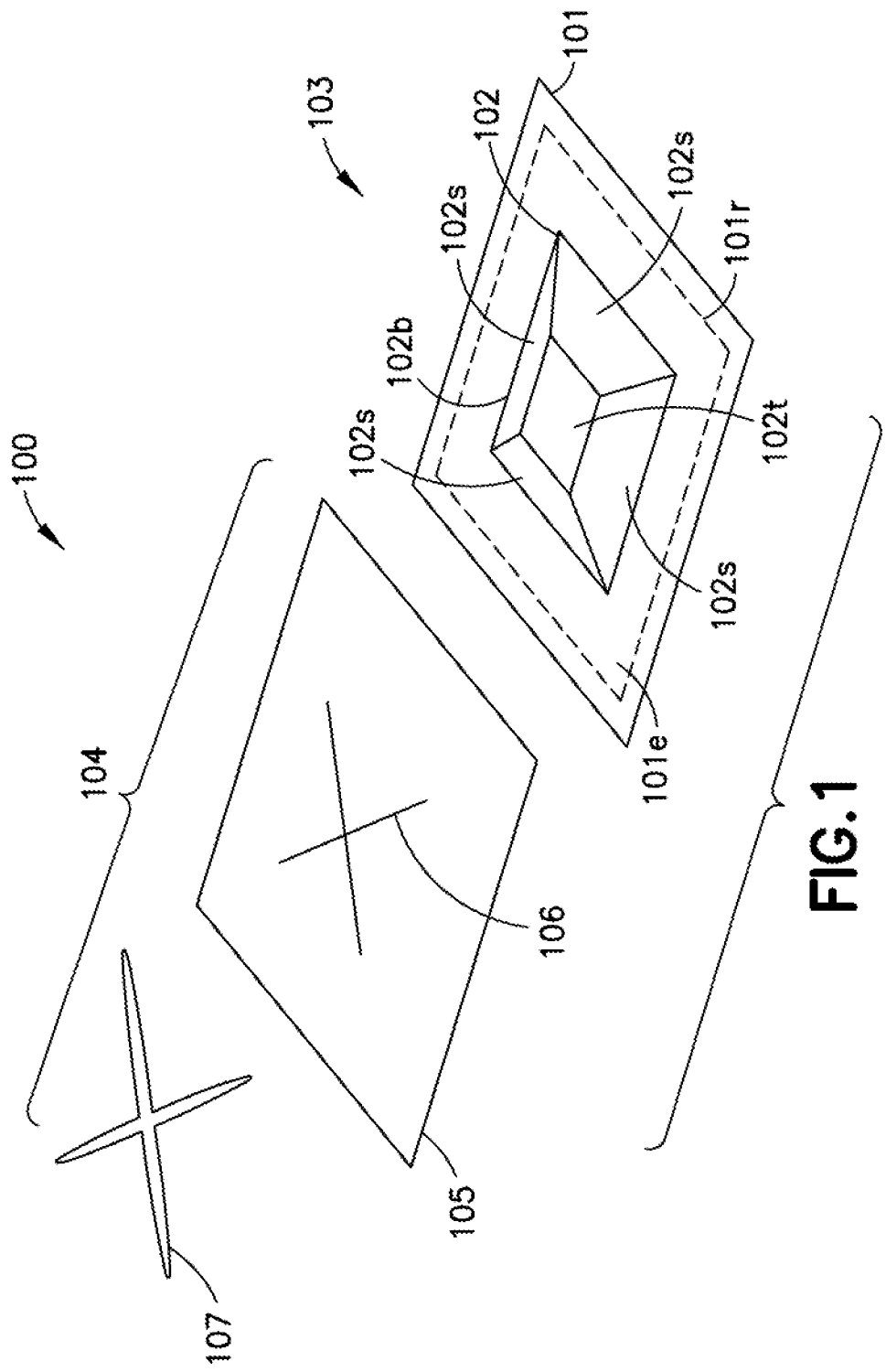
Figure 3A:
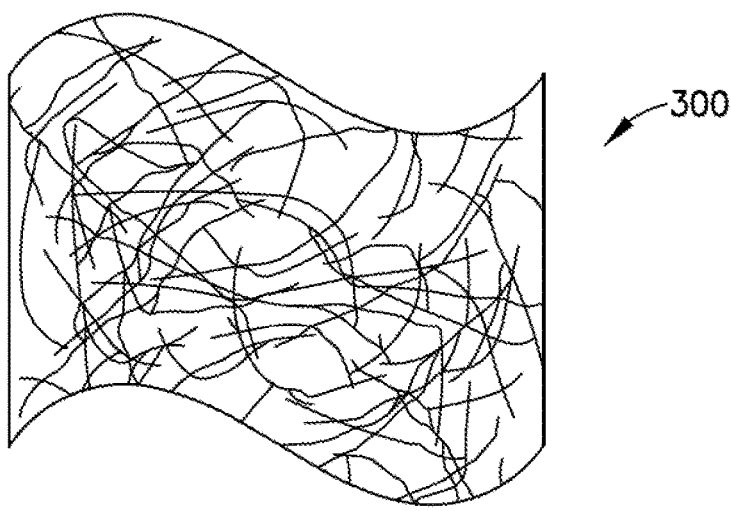
Figure 3B:
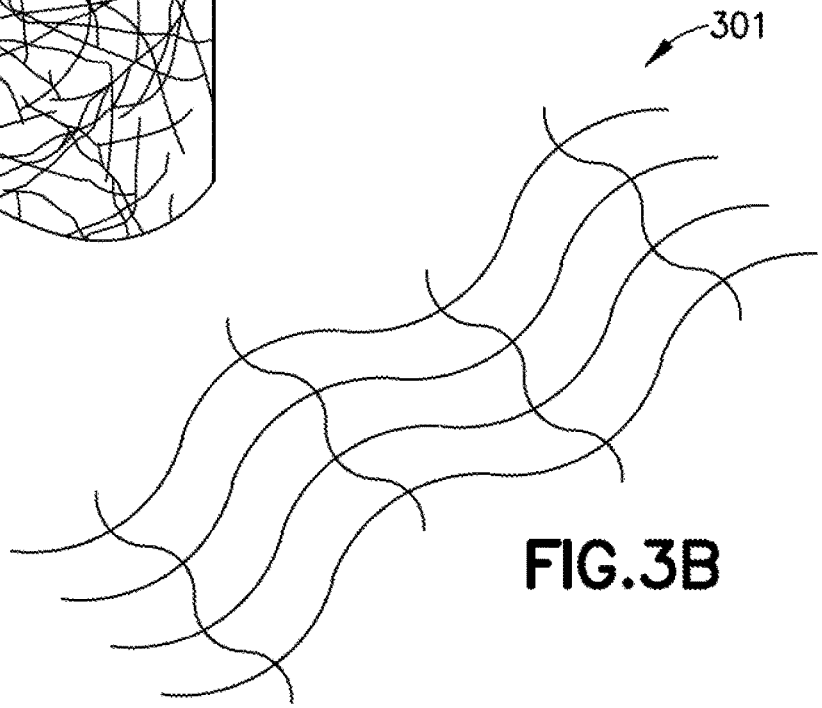
Figure 3C:
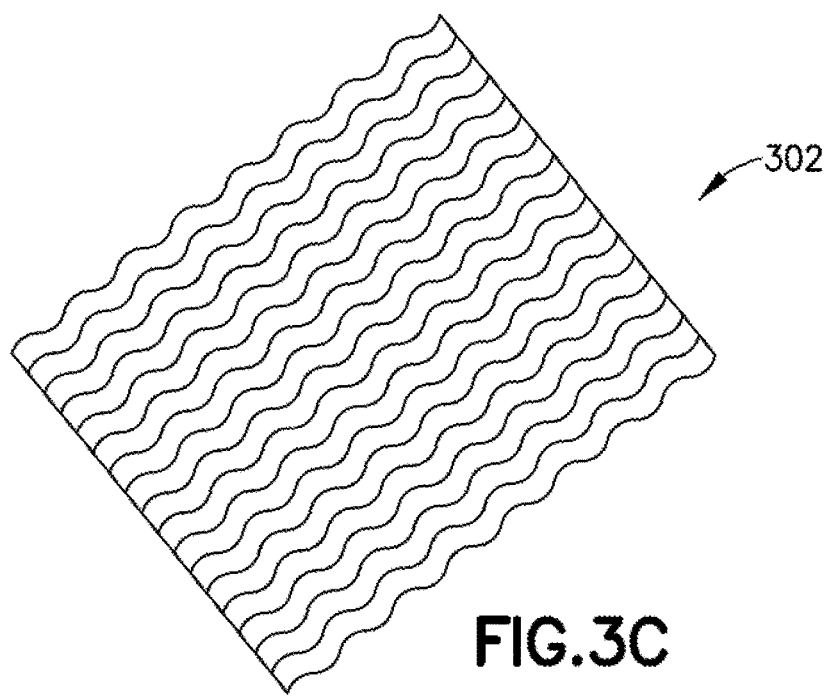
Figure 7:
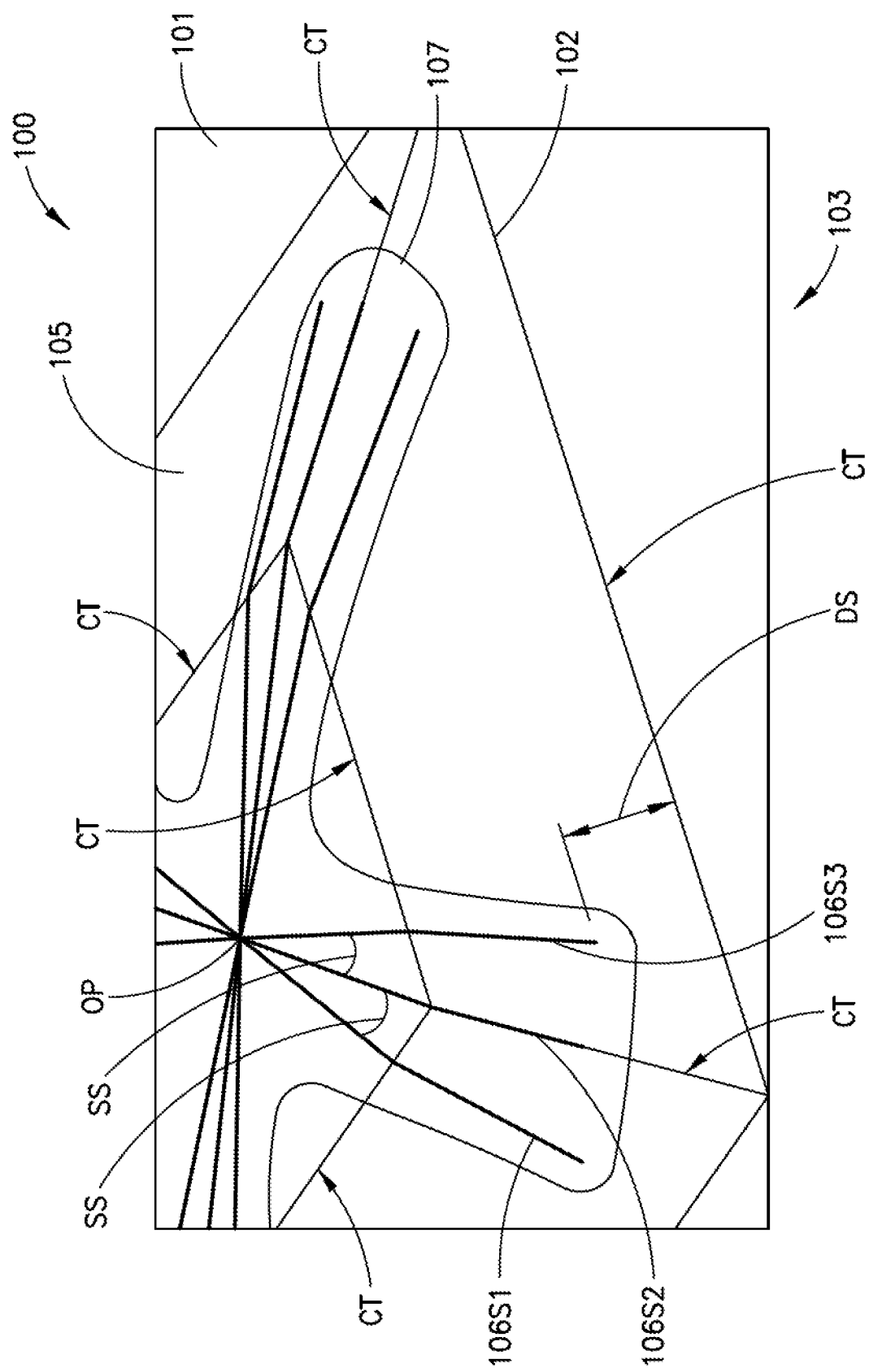
Figure 8:
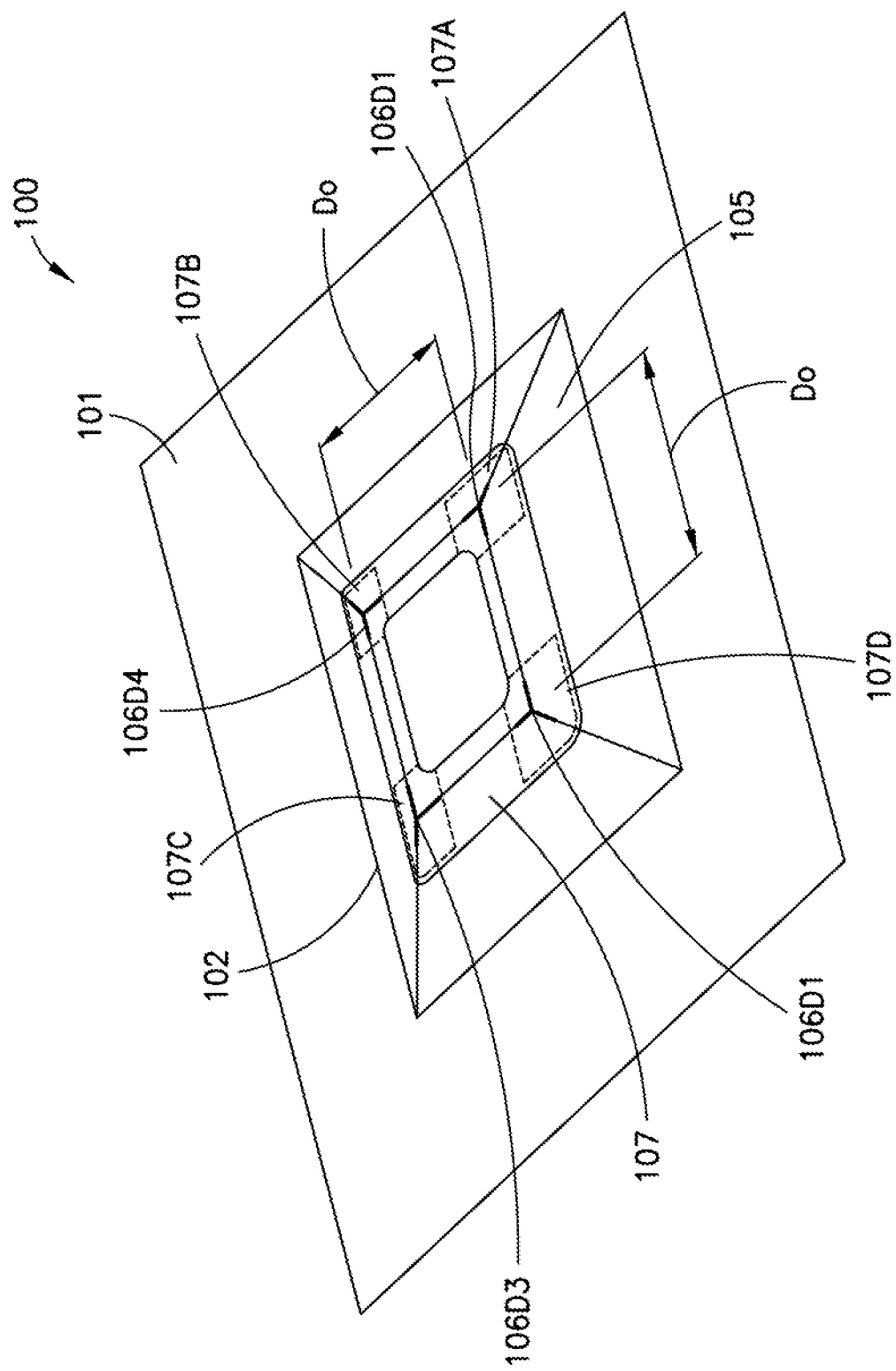
Figure 9:
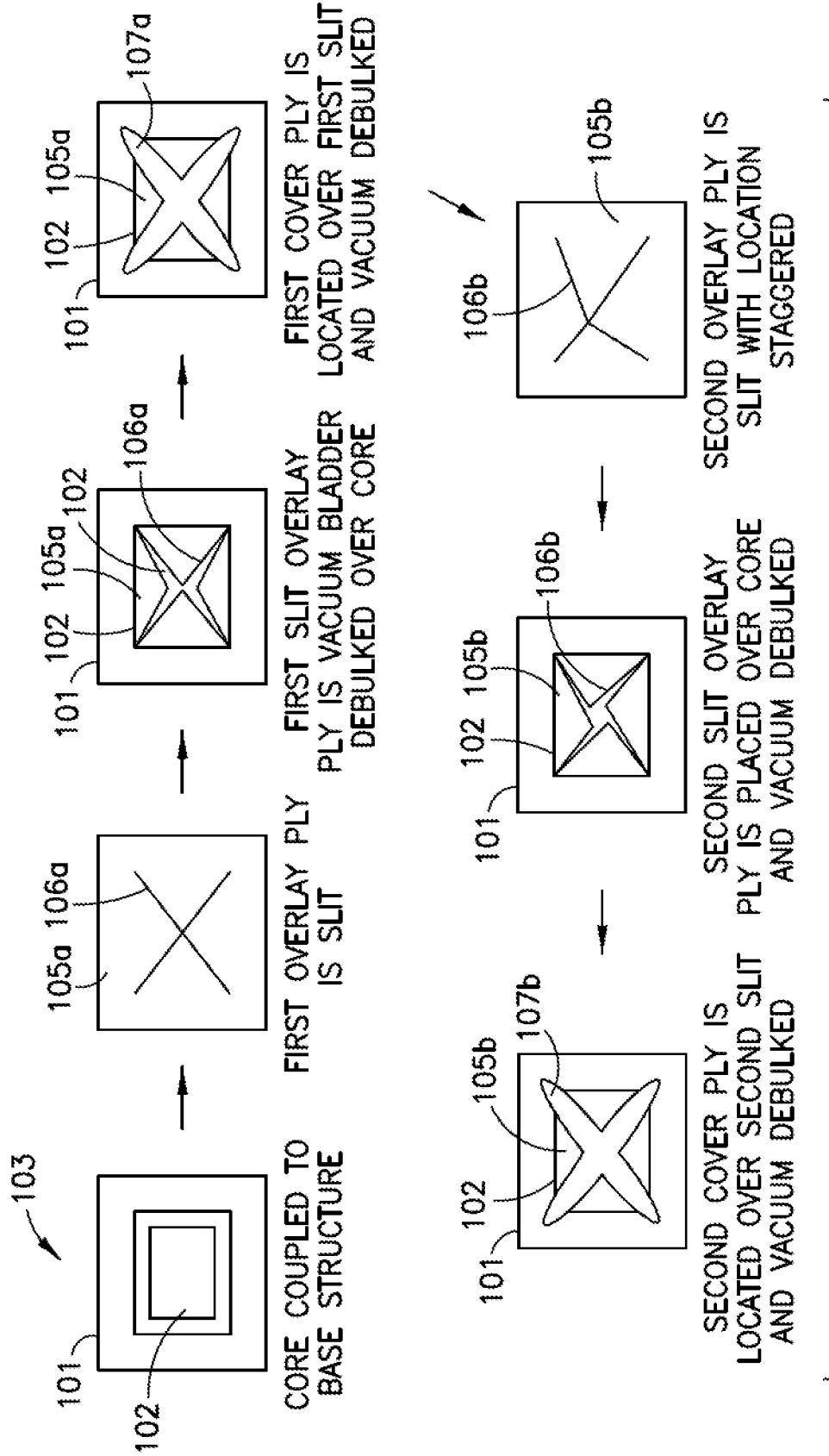
Figure 10:
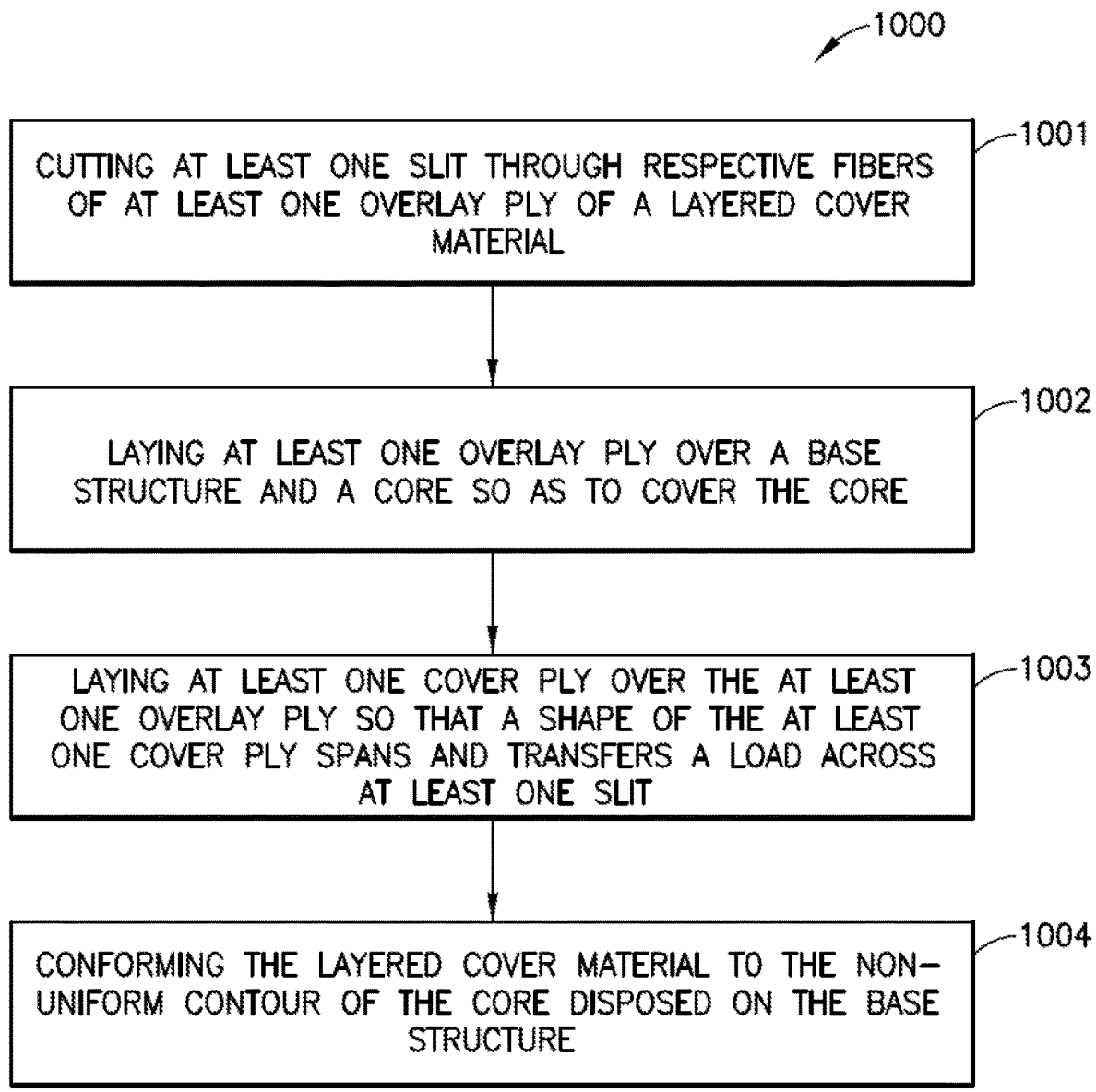
Figure 11:
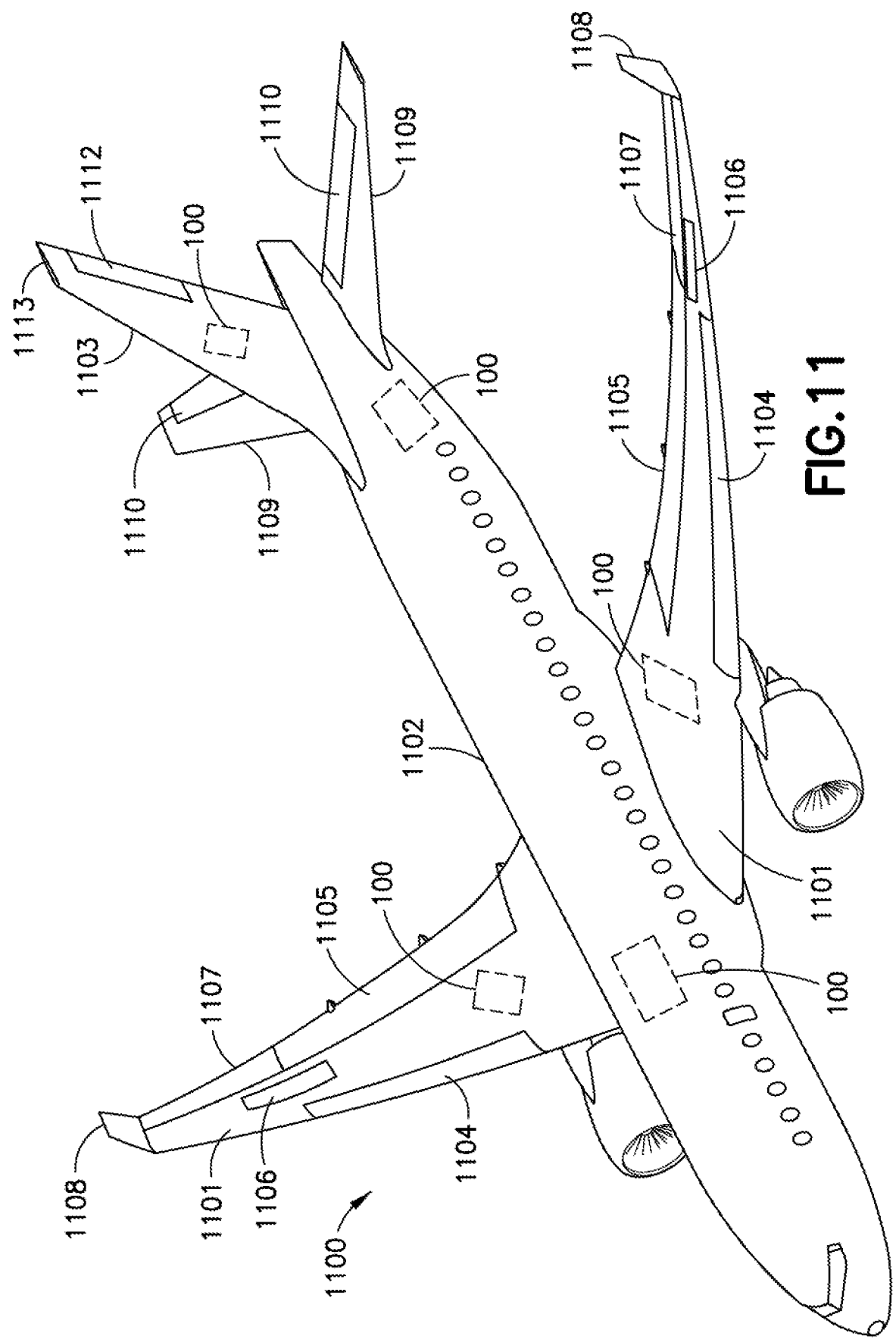

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of a composite structure in accordance with one or more aspects of the present disclosure;

FIG. 2A is a schematic illustration of a portion of a composite structure in accordance with one or more aspects of the present disclosure;

FIG. 2B is a schematic illustration of a portion of a composite structure in accordance with one or more aspects of the present disclosure;

FIG. 2C is a schematic illustration of a portion of a composite structure in accordance with one or more aspects of the present disclosure;

FIG. 3A is a schematic illustration of a material used in the production of a composite structure in accordance with one or more aspects of the present disclosure;

FIG. 3B is a schematic illustration of a material used in the production of a composite structure in accordance with one or more aspects of the present disclosure;

FIG. 3C is a schematic illustration of a material used in the production of a composite structure in accordance with one or more aspects of the present disclosure;

FIG. 4A is a schematic illustration of a portion of a composite structure in accordance with one or more aspects of the present disclosure;

FIG. 4B is a schematic illustration of a portion of a composite structure in accordance with one or more aspects of the present disclosure;

FIG. 5A is a schematic illustration of a portion of a composite structure in accordance with one or more aspects of the present disclosure;

FIG. 5B is a schematic illustration of a portion of a composite structure in accordance with one or more aspects of the present disclosure;

FIG. 6 is a schematic illustration of a portion of a composite structure in accordance with one or more aspects of the present disclosure;

FIG. 7 is a schematic illustration of a portion of a composite structure in accordance with one or more aspects of the present disclosure;

FIG. 8 is a schematic illustration of a portion of a composite structure in accordance with one or more aspects of the present disclosure;

FIG. 9 is a schematic illustration of a method for laying up a composite structure in accordance with one or more aspects of the present disclosure;

FIG. 10 is a flow diagram of a method for laying up a composite structure in accordance with one or more aspects of the present disclosure; and FIG. 11 is a schematic illustration of an aircraft in accordance with one or more aspects of the present disclosure.

DETAILED DESCRIPTION

The aspects of the present disclosure described herein provide a composite part and an improved method of applying composite cores and plies to a composite part. The aspects of the present disclosure may substantially reduce labor spent to form the composite part and may reduce instances of damaged cores and the need for rework, therefore reducing time and cost of fabricating the composite part.

Illustrative, non-exhaustive examples, which may or may not be claimed, of the subject matter according to the present disclosure are provided below.

Referring to FIG. 1, slit forming is performed by providing slits in a composite ply where the slits may allow for tension in the composite ply to be released so the composite ply can be contoured to a core without applying substantial force to the core to sculpt the composite ply to the core. Slit forming may also release wrinkle causing stresses allowing for manual or automated forming of the composite ply to the core and also reduce the manual touch time to wipe out wrinkles.

In one aspect, slit forming, as described herein, may provide for a reduction in manual labor and a reduction in core damage, resulting in a reduction of rework. Slit forming may provide a reduction of labor time by about 80% and may reduce core damage or rework by about 25%. In other aspect, more or less than a reduction by 80% in labor time or a reduction by 25% in core damage or rework may be achieved.

In one aspect, while the composite structure 100 described herein is described with respect to application in an aircraft 1100 (shown in FIG. 11), alternatively, the composite structure 100 may be utilized in any suitable industry, such as e.g., automotive, maritime, or aerospace. The composite structure 100 may be used, for example, in fabrication of wings 1101, a fuselage 1102, a tail 1103, a hull, etc.

Still referring to FIG. 1, an exemplary composite structure 100 is illustrated incorporating aspects of the present disclosure. The composite structure 100 includes a base structure 101, a core 102 disposed on the base structure 101, the core 102 having a non-uniform contour relative to the base structure 101, and a layered cover material 104 disposed on the base structure 101 covering the core 102, the layered cover material 104 conforming to the non-uniform contour of the core 102.

Referring to FIGS. 1, 2A, 2C, and 11, the base structure 101 forms, for example, any part of the aircraft 1100, such as the wings 1101 (including winglets 1108), the fuselage 1102, the tail 1103 (including the horizontal and/or vertical stabilizers 1109, 1113), control surfaces such as slats 1104, flaps 1105, spoilers 1106, ailerons 1107, elevators 1110, rudder 1112, and/or any portion thereof. In one aspect, the base structure 101 has any suitable area (i.e., length L1×width W1) where, the length L and width W1 of the base structure 101 may be any suitable length or width. In one aspect, the length L1 and width W1 of the base structure 101 are equal. In one aspect, length L1 and width W1 of the base structure 101 are unequal. In one aspect, the base structure 101 includes an engagement surface 101e. The engagement surface 101e is configured to engage the core 102 and/or the layered cover material 104.

Referring now to FIGS. 1, 2B-2C, and 3A, in one aspect, the core 102 has a first surface 102b, a second surface 102t and sides 102s. In one aspect, the core 102 comprises a honeycomb structure 200, which may provide reduced weight for the composite structure 100 while still providing stiffness. Alternatively, the core 102 may be one of a foam material, a metal, or a fibrous material 300 (as seen in FIG. 3A). For example, the core 102 may be aluminum, fiberglass phenolic, fiberglass polyimide, NOMEX®, polyurethane, polyisocyanate, ROHACELL®, polyetherimide, polyethersulfone, polyimide, polyethylene, styrofoam, silicone foam, polyvinylchloride, or any other suitable material.

The first surface 102b of the core 102 is configured to be coupled to the engagement surface 101e of the base structure 101. In one aspect, the first surface 102b of the core 102 has any suitable area (i.e., length L2×width W2) where, the length L2 and width W2 of the first surface 102b are smaller than the length L1 and width W1 of the base structure 101. In one aspect, the length L2 and width W2 of the first surface 102b may be any suitable length or width. In one aspect, the length L2 and width W2 of the first surface 102b are equal. In one aspect, length L2 and width W2 of the first surface 102b are unequal. In one aspect, as the first surface 102b of the core 102 is coupled to the engagement surface 101e, the core 102 does not cover the entire engagement surface 101e due to the core 102 being smaller in size so that a portion Y of the base structure 101 is left exposed.

In one aspect, the second surface 102t of the core 102 has any suitable area (i.e., length L3×width W3) where, the length L3 and width W3 of the second surface 102t are smaller than the length L2 and width W2 of the first surface 102b. In one aspect, the length L3 and width W3 of the second surface 102t may be any suitable length or width. In one aspect, the length L3 and width W3 of the second surface 102t are equal. In one aspect, length L3 and width W3 of the second surface 102t are unequal.

The first surface 102b and the second surface 102t are coupled at least by the sides 102s. In one aspect, the sides 102s are sloped at any suitable ramp angle α relative to the second surface 102t and/or the first surface 102b. The first and second surfaces 102b, 102t may be spaced from each other by any suitable distance H to provide, with the sloping sides 102s, the composite structure 100 with a non-uniform height.

In a particular aspect, the difference in surface area between the first surface 102b and the second surface 102t, combined with the sides 102s, results in the core 102 having a trapezoidal cross-section. Alternatively, the core 102 may have any suitable shape having any suitable cross-sectional contoured surface over which the layered cover material 104 is placed. For example, the core 102 may be cuboid, domed, rounded, pyramidical, multifaceted, or any combination thereof.

Referring to FIGS. 1, 3A-3C, and 4A-4B, in one aspect, the base structure 101 and the core 102 form a contoured structure 103. The layered cover material 104 is disposed on the contoured structure 103 and conforms to the contoured structure 103. The layered cover material 104 includes at least one overlay ply 105, each of the at least one overlay ply 105 having at least one slit 106 cut through fibers of the respective overlay ply 105. The layered cover material 104 also includes at least one cover ply 107 having a shape that spans the at least one slit 106, and is configured to transfer a load across the at least one slit 106. In one aspect, the cover ply 107 may be omitted where a sufficient number of overlay plies are provided and sufficient stagger/offset of the slits in the overlay plies is provided.

Generally, the at least one overlay ply 105 is configured to provide high tensile strength and high stiffness to the contoured structure 103 due to a transfer of a load applied to the at least one overlay ply 105 through continuous fibers of the at least one overlay ply 105. The at least one overlay ply 105 may be any suitable material. For example, the at least one overlay ply 105 is one or more of a fibrous material 300 (FIG. 3A), a multidirectional woven material 301 (FIG. 3B), or a unidirectional material 302 (FIG. 3C), such as, one or more of carbon fiber or glass fiber.

In one aspect, the at least one overlay ply 105 has any suitable area (i.e., length L4, and width W4). In one aspect, the length L4 and width W4 of the at least one overlay ply 105 may be any suitable length or width. In one aspect, the length L4 and width W4 of the at least one overlay ply 105 are equal. In one aspect, length L4 and width W4 of the at least one overlay ply 105 are unequal. In one aspect, the area of the at least one overlay ply 105 depends on multiple factors including, for example, the area of the base structure 101, the area of the first and second surfaces 102b, 102t of the core 102, the height H of the core 102, etc.

In one aspect, the at least one overlay ply 105 is disposed on the contoured structure 103 and aligned within a predetermined tolerance, for example, with respect to the edge 101a of the base structure 101 or the core 102. The predetermined tolerance may be defined by a reference line 101r on the base structure 101 that is configured to provide a visual tolerance zone for placement of the layered cover material 104 over the core 102 and the base structure 101. In one aspect, the reference line 101r is a predetermined distance X from the edge 101a of the base structure 101 or the core 102. In one aspect, the reference line 101r may also serve to define a placement/tolerance zone for the placement of the core 102 on the base structure 101.

The at least one overlay ply 105 includes at least one slit 106 cut therein where, for example, a position and configuration of the at least one slit 106 in the overlay ply 105 depends on a contour of the core 102. In one aspect, the at least one slit 106 is cut on a cutter when the net shape of the at least one overlay ply 105 is cut. In one aspect, the at least one slit 106 is cut at predetermined locations on the at least one overlay ply 105 so that the at least one slit 106 is positioned and configured to release tension in the at least one overlay ply 105 so the at least one overlay ply 105 may be applied over the core 102 with minimal application force to the core 102 to sculpt or contour the at least one overlay ply 105 to the core 102. In one aspect, the at least one slit 106 may release wrinkle causing stresses to provide for manual or automated forming of the at least one overlay ply 105 relative to the core 102 and may reduce manual touch time to wipe out wrinkles.

In one aspect, each of the at least one slit 106 of the at least one overlay ply 105 is aligned with a respective contour transition CT (FIGS. 2B, 2C, and 7) of the core 102. In other aspects, the at least one slit 106 of the at least one overlay ply 105 may be offset from the respective contour transition CT, such that the at least one slit 106 is not aligned with or is spaced a predetermined distance from a respective contour transition CT. The contour transition CT may be any transition between surfaces/facets of the composite structure 100 including a transition from the second side 102t of the core 102 to the sides 102s, a transition between the sides 102s of the core 102, or any other transition between surfaces/facets of the composite structure 100.

The at least one slit 106 may span any portion of the core 102. In one aspect, the at least one slit 106 spans only the second surface 102t and a portion of the sides 102s so that the at least one slit 106 is spaced a respective predetermined distance DS from the base structure 101 of first surface 101b (i.e., the at least one slit 106 does not extend all the way to the base structure 101). The transition from the core 102 to the base structure 101 may be a load point CP (FIG. 2C), where spanning only a portion of the sides 102s of the core 102 with the at least one slit 106, away from the load point CP may reduce stresses caused by application of a load at the load point CP (FIG. 2C).

Referring to FIGS. 5A-5B, in one aspect, forming the at least one overlay ply 105 can be accomplished in any suitable manner, such as with vacuum forming techniques, such as, for example, vacuum debulking using a standard vacuum table or vacuum 500 and vacuum bag 501, which may provide consistent application pressure to the core 102 and reduce part rework. In one aspect, the at least one overlay ply 105 is conformed to the non-uniform contour of the contoured structure 103 with positive pressure, such as by an air bladder 502 which may provide consistent application pressure and reduce part rework. In one aspect, the air bladder 502 and/or the vacuum bag 501 may smooth the at least one overlay ply 105 against the contoured structure 103 with a wiping action 503 of the air bladder 502 and/or the vacuum bag 501 against the at least one overlay ply 105.

Referring now also to FIG. 4B, in a particular aspect, the at least one overlay ply 105 is a layered stack of overlay plies 105L. The layered stack of overlay plies 105L includes any suitable number of overlay plies 105a-105b each having at least one slit 106a-106b cut through fibers of the respective overlay plies 105a-105b. While two overlay plies 105a-105b and two slits 106a-106b are shown for exemplary purposes, in other aspects, there may be more or less than two overlay plies or two slits.

In one aspect, the layered stack of overlay plies 105L includes at least a first overlay ply 105a and a second overlay ply 105b where at least one slit 106a of the first overlay ply 105a is offset (i.e., not aligned with or not placed, for example, one above the other) a distance O (See FIG. 4B) or staggered (i.e., rotated) a predetermined angle S (See FIG. 4A) relative to a corresponding slit 106b of the second overlay ply 105b. In one aspect, as noted above each slit 106a-b of the layered stack of overlay plies 105L corresponds to a respective contour transition CT (FIGS. 2C and 7) of the core 102.

As seen in FIG. 7, in a particular aspect, for example, three slits 106S1-106S3 are formed in the overlay ply 105 where the three slits 106S1-106S3 have a starburst slit pattern. In this particular aspect, the starburst pattern depicts the three slits 106S1-106S3 diverging from a common origin point OP and being staggered or rotated relative to one another by a predetermined angle SS. The three slits 106S1-106S3 may also be offset from one another such that each slit diverges from an offset origin point relative to each other. The predetermined angle S between each of the three slits 106S1-106S3 may be equal or may be unequal. As seen in FIG. 8, in a particular aspect, for example, four slits 106D1-106D4 may be formed in the overlay ply 105 where each of the slits 106D1-106D4 comprises three slits angled relative to each other to form a dart slit pattern. In this particular aspect, the four slits 106D1-106D4 each having the shape of a dart are offset a distance DO from one another along the corner contour transitions of the second surface 102t of the core 102. While the starburst and dart patterns are described as having three and four slits respectively, in other aspects, the starburst and dart patterns may have any suitable number of slits. In other aspects, the slit(s) 106a-106b may be formed with any suitable pattern or any suitable combination of patterns. In one aspect, the pattern or combination of patterns depends on part size, stress applied to the composite part, the weight of the composite part, formability of the composite part, etc.

Referring now to FIGS. 1, 3A-3C and 6, the at least one slit 106 is a discontinuity in the load transfer along the fibers of the at least on overlay ply 105 At least one cover ply 107 is positioned over and/or under the at least one slit 106 (i.e., the at least on cover ply 107 may be placed over the at least one overlay ply 105 and/or between two or more overlay plies 105) to transfer the load across the at least one slit 106. In one aspect, the at least one cover ply 107 is placed over the at least one slit 106 to maintain or improve the load carrying capabilities of the at least one overlay ply 105 across the at least one slit 106. In one aspect, the at least one cover ply 107 of the layered cover material 104 is formed from the same material as the at least one overlay ply 105, including one or more of a fibrous material 300 (FIG. 3A), a multidirectional woven material 301 (FIG. 3B), or a unidirectional material 302 (FIG. 3C). In other aspects, the at least one cover ply 107 and the at least one overlay ply 105 are formed of dissimilar materials.

Before placement on the contour structure 103, the shape of the at least one cover ply 107 is cut on a cutter. In one aspect, the at least one cover ply 107 and the at least one slit 106 are any shape suitable for the contour of the composite structure 100. In one aspect, the at least one cover ply 107 is larger than the total encompassed area of the at least one slit 106 in the at least one overlay ply 105, such that the at least one cover ply 107 covers the entire area where there is/are slit(s) in the at least one overlay ply 105 and acts to transfer a load over the area where the at least one slit 106 is located. In one aspect, the at least one cover ply 107 is common to each of the at least one slit 106 of each at least one overlay ply 105. Alternatively, each at least one slit 106 or sets of slits corresponding to a common transition CT has at least one cover ply 107A-107D in which to transfer a load across the at least one slit 106 that is separate and distinct from a cover ply 107 of another of the at least one slit or set of slits corresponding to a common transition CT (shown in, for example, FIG. 8). The determination of how many at least one slit 106 and how many at least one cover ply 107 to utilize in fabricating the composite structure with depend, similar to that described above with respect to the pattern of the slits, on the composite part being made (e.g., size, stress, weight, formability).

The at least one cover ply 107 is formed to the contoured structure 103 in a manner substantially similar to that described above with respect to the at least one overlay ply 105 (e.g., vacuum debulked or positive pressure).

Referring now to FIGS. 1, 9 and 10, in one aspect, a method 1000 for laying up the composite structure 100 includes cutting the at least one slit 106 through respective fibers of at least one overlay ply 105 of a layered cover material 104 (FIG. 10, Block 1001). The at least one overlay ply 105 is laid over the base structure 101 and the core 102 disposed on the base structure 101 so as to cover the core 102 (FIG. 10, Block 1002). The at least one cover ply 107, of the layered cover material 104, is laid over the at least one overlay ply 105 so that a shape of the at least one cover ply 107 spans the at least one slit 106 and transfers a load across the at least one slit 106 (FIG. 10, Block 1003). The layered cover material 104 is conformed in any suitable manner, such as described herein, to a non-uniform contour of the core 102 disposed on the base structure 101 (FIG. 10, Block 1004).

Generally, as seen in FIG. 9, the core 102 is coupled to the base structure 101. The first overlay ply 105a receives at least one slit 106a before being placed over the core 102. The first overlay ply 105a is then formed to the base structure 101 and core 102, in a manner similar to that described above (e.g., vacuum debulked, positive pressure wiping, or applied by hand). A first cover ply 107a is then placed and formed over the at least one slit 106a similar to the forming of the first overlay ply 105a to the core 102 and base structure 101. A second overlay ply 105b having at least one slit 106b is placed over the first cover ply 107a, first overlay ply 105a, and the core 102. The second overlay ply 105b is then formed to the base structure 101 and core 102 with the first overlay ply 105a and first cover ply 107a formed thereon, in a manner similar to that above. Finally, a second cover ply 107b is adhered over the at least one slit 106b, forming the composite structure 100.

In one aspect, the slit 106b through respective fibers of the second overlay ply 105b is offset from a corresponding slit 106a of the first overlay ply 105a, in a manner similar to that described above with respect to a starburst pattern, dart slit pattern, or any suitable pattern. Alternatively, the first cover ply 107a may be laid over the core 102 before the first overlay ply 105a is laid or, a single common cover ply 107 may be laid over both the first and second slits 106a, 106b of the first and second overlay plies 105a, 105b.

While the previous example is described with respect to the composite structure 100 having only two overlay plies, two slits, and two cover plies, alternatively, the composite structure 100 may utilize any suitable number of each in any suitable configuration, such as, for example, three overlay plies each with multiple slits and a single cover ply placed thereon.

The following are provided in accordance with the aspects of the present disclosure:

A. A composite structure comprising:
  a base structure;
  a core disposed on the base structure, the core having a non-uniform contour relative to the base structure,
  a layered cover material disposed on the base structure covering the core, the layered cover material conforming to the non-uniform contour of the core and having at least one overlay ply, each of the at least one overlay ply having at least one slit cut through fibers of the respective overlay ply, and
  at least one cover ply having a shape that spans the at least one slit, and being configured to transfer a load across the at least one slit.

A1. The composite structure of paragraph A, wherein the at least one overlay ply comprises a multidirectional woven material.

A2. The composite structure of paragraph A, wherein the at least one overlay ply comprises a unidirectional material.

A3. The composite structure of paragraph A, the at least one cover ply comprises a multidirectional woven material.

A4. The composite structure of paragraph A, wherein the at least one overlay ply and the at least one cover ply comprise one or more of carbon fiber and glass fibers.

A5. The composite structure of paragraph A, wherein the at least one overlay ply comprises at least a first overlay ply and a second overlay ply where the at least one slit of the first overlay ply is offset from a corresponding slit of the second overlay ply.

A6. The composite structure of paragraph A, wherein the at least one cover ply is common to each slit of the at least one overlay ply.

A7. The composite structure of paragraph A, wherein each slit of the at least one overlay ply corresponds to a respective contour transition of the core.

A8. The composite structure of paragraph A7, wherein slits corresponding to a common contour transition are staggered relative to one another.

A9. The composite structure of paragraph A7, wherein at least one slit of the at least one overlay ply is aligned with a respective contour transition of the core.

A10. The composite structure of paragraph A, wherein the non-uniform contour of the core includes a non-uniform height relative to the structure.

A11. The composite structure of paragraph A, wherein the at least one cover ply is disposed between overlay plies.

A12. The composite structure of paragraph A, wherein the core comprises a honeycomb structure.

A13. The composite structure of paragraph A, wherein the core comprises a fibrous material.

A14. The composite structure of paragraph A, wherein the core comprises a metal.

A15. The composite structure of paragraph A, wherein the core comprises a foam material.

A16. The composite structure of paragraph A, wherein the core is configured to strengthen the base structure.

A17. The composite structure of paragraph A, wherein the layered cover material forms an inner mold line of the composite structure.

A18. The composite structure of paragraph A, wherein the at least one slit is spaced from the base structure.

A19. The composite structure of paragraph A, wherein the at least one slit of the at least one overlay ply comprises more than one slit having a starburst configuration.

A20. The composite structure of paragraph A, wherein the at least one slit has a corner dart configuration.

A21. The composite structure of paragraph A, wherein the composite structure is an aircraft wing, a wing edge, or a wing tip.

A22. The composite structure of paragraph A21, wherein the base structure forms a skin of the aircraft wing, the wing edge, or the wing tip.

A23. The composite structure of paragraph A, wherein the base structure forms an outer mold line of the composite structure.

B. A method for laying up a composite structure, the method comprising:
cutting at least one slit through respective fibers of at least one overlay ply of a layered cover material; and
conforming the layered cover material to a non-uniform contour of a core disposed on a base structure by
laying the at least one overlay ply over the base structure and the core disposed on a base structure so as to cover the core, and
laying at least one cover ply, of the layered cover material, over the at least one overlay ply so that a shape of the at least one cover ply spans the at least one slit and transfers a load across the at least one slit.

B1. The method of paragraph B, further comprising offsetting a slit of a first overlay ply from a corresponding slit of a second overlay ply.

B2. The method of paragraph B, wherein a common cover ply is laid over each slit of the at least one overlay ply.

B3. The method of paragraph B, further comprising aligning at least one slit of the at least one overlay ply with a respective contour transition of the core.

B4. The method of paragraph B, further comprising staggering slits of more than one overlay ply, corresponding to a common contour transition of the core, with respect to each other.

B5. The method of paragraph B, further comprising laying the at least one cover ply between overlay plies.

B6. The method of paragraph B, further comprising conforming the layered cover material to the non-uniform contour of the core disposed on the base structure with vacuum pressure.

B7. The method of paragraph B, further comprising conforming the layered cover material to the non-uniform contour of the core disposed on the base structure with positive pressure.

B8. The method of paragraph B7, further comprising providing the positive pressure with a bladder and smoothing a surface of the layered cover material with a wiping action of the bladder.

C. A composite structure comprising:
a base structure;
a core disposed on the base structure, the core having a non-uniform contour relative to the base structure;
a layered cover material disposed on the base structure covering the core, the layered cover material conforming to the non-uniform contour of the core and having
a layered stack of overlay plies, each overlay ply in the layered stack having at least one slit cut through fibers of the respective overlay ply, and
at least one cover ply in the layered stack of overlay plies, each cover ply having a shape that spans the at least one slit, and being configured to transfer a load across the at least one slit.

C1. The composite structure of paragraph C, wherein each overlay ply comprises a multidirectional woven material.

C2. The composite structure of paragraph C, wherein each overlay ply comprises a unidirectional material.

C3. The composite structure of paragraph C, the at least one cover ply comprises a multidirectional woven material.

C4. The composite structure of paragraph C, wherein each overlay ply and the at least one cover ply comprise one or more of carbon fiber and glass fibers.

C5. The composite structure of paragraph C, wherein the layered stack of overlay plies comprises at least a first overlay ply and a second overlay ply where the at least one slit of the first overlay ply is offset from a corresponding slit of the second overlay ply.

C6. The composite structure of paragraph C, wherein the at least one cover ply is common to each slit in the layered stack of overlay plies.

C7. The composite structure of paragraph C, wherein each slit in the layered stack of overlay plies corresponds to a respective contour transition of the core.

C8. The composite structure of paragraph C7, wherein slits corresponding to a common contour transition are staggered relative to one another.

C9. The composite structure of paragraph C7, wherein at least one slit of the layered stack of overlay plies is aligned with a respective contour transition of the core.

C10. The composite structure of paragraph C, wherein the non-uniform contour of the core includes a non-uniform height relative to the structure.

C11. The composite structure of paragraph C, wherein the at least one cover ply is disposed between overlay plies.

C12. The composite structure of paragraph C, wherein the core comprises a honeycomb structure.

C13. The composite structure of paragraph C, wherein the core comprises a fibrous material.

C14. The composite structure of paragraph C, wherein the core comprises a metal.

C15. The composite structure of paragraph C, wherein the core comprises a foam material.

C16. The composite structure of paragraph C, wherein the core is configured to strengthen the base structure.

C17. The composite structure of paragraph C, wherein the layered cover material forms an inner mold line of the composite structure.

C18. The composite structure of paragraph C, wherein the at least one slit is spaced from the base structure.

C19. The composite structure of paragraph C, wherein the at least one slit of the at least one overlay ply comprises more than one slit having a starburst configuration.

C20. The composite structure of paragraph C, wherein the at least one slit has a corner dart configuration.

C21. The composite structure of paragraph C, wherein the composite structure is an aircraft wing, a wing edge, or a wing tip.

C22. The composite structure of paragraph C21, wherein the base structure forms a skin of the aircraft wing, the wing edge, or the wing tip.

C23. The composite structure of paragraph C, wherein the base structure forms an outer mold line of the composite structure.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 9 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A composite structure comprising:
a rigid base structure;
a core disposed on the rigid base structure, the core having a non-uniform contour relative to the rigid base structure and a faceted peripheral side extending from the rigid base structure;
a layered cover material disposed on the rigid base structure covering the core so as to form a portion of the rigid base structure and encase the core within the rigid base structure, the layered cover material conforming to the non-uniform contour of the core and having
at least one overlay ply, each of the at least one overlay ply having at least one slit cut through fibers of the respective overlay ply, and
at least one cover ply having a shape that spans the at least one slit, and being configured to transfer a load across the at least one slit, wherein an entirety of the at least one slit extending along the peripheral side of the core is spaced from the rigid base structure;
wherein each slit of the at least one overlay ply corresponds to and extends lengthwise along a respective contour transition of the core where the respective contour transition is an angular transition forming a transition line between adjacent facets of the faceted peripheral side, and slits corresponding to a common contour transition are staggered relative to one another so as to extend lengthwise along the common contour transition where at least one slit extends along and spans the transition line of the common contour transition.

2. The composite structure of claim 1, wherein the at least one overlay ply comprises at least a first overlay ply and a second overlay ply where the at least one slit of the first overlay ply is offset from a corresponding slit of the second overlay ply so as to stagger the slits.

3. The composite structure of claim 1, wherein the at least one cover ply is common to each slit of the at least one overlay ply.

4. The composite structure of claim 1, wherein the at least one slit of the at least one overlay ply comprises more than one slit having a starburst configuration.

5. The composite structure of claim 1, wherein the at least one slit has a corner dart configuration.

6. The composite structure of claim 1, wherein at least one slit of the at least one overlay ply is aligned with a respective contour transition of the core.

7. The composite structure of claim 1, wherein the non-uniform contour of the core includes a non-uniform height relative to the structure.

8. A method for laying up a composite structure, the method comprising:
cutting at least one slit through respective fibers of at least one overlay ply of a layered cover material;
conforming the layered cover material to a non-uniform contour of a core disposed on a base structure, so that the layered covered material forms a portion of the base structure and encases the core within the base structure, where the base structure is rigid when cured, by
laying the at least one overlay ply over the rigid base structure and the core disposed on the rigid base structure so as to cover the core, and
laying at least one cover ply, of the layered cover material, over the at least one overlay ply so that a shape of the at least one cover ply spans the at least one slit and transfers a load across the at least one slit; and
conforming the layered cover material to the non-uniform contour of the core disposed on the base structure with a bladder, where the bladder smooths a surface of the layered cover material with a wiping action of the bladder relative to the layered cover material.

9. The method of claim 8, wherein the slits are staggered so that a slit of a first overlay ply is offset from a corresponding slit of a second overlay ply.

10. The method of claim 8, further comprising aligning at least one slit of the at least one overlay ply with a respective contour transition of the core.

11. The method of claim 8, further comprising laying the at least one cover ply between overlay plies.

12. A composite structure comprising:
a rigid base structure;
a core disposed on the rigid base structure, the core having a non-uniform contour relative to the rigid base structure;
a layered cover material disposed on the rigid base structure covering the core so as to form a portion of the rigid base structure and encase the core within the rigid base structure, the layered cover material conforming to the non-uniform contour of the core and having
a layered stack of overlay plies, each overlay ply in the layered stack having at least one slit cut through fibers of the respective overlay ply, and
at least one cover ply in the layered stack of overlay plies, each cover ply having a shape that spans the at least one slit, and being configured to transfer a load across the at least one slit;
wherein the core has a faceted surface and each slit of the at least one overlay ply corresponds to and extends lengthwise along a transition line of the faceted surface and slits corresponding to a common transition line are staggered relative to one another so as to extend lengthwise along the common transition line where at least one slit coincides with and spans the common transition line.

13. The composite structure of claim 12, wherein the composite structure is an aircraft wing, a wing edge, or a wing tip.

14. The composite structure of claim 13, wherein the rigid base structure forms a skin of the aircraft wing, the wing edge, or the wing tip.

15. The composite structure of claim 1, wherein the load is transferred across the at least one slit through continuous fibers of the at least one cover ply.

16. The composite structure of claim 1, wherein the composite structure is an aircraft wing, a wing edge, or a wing tip.

17. The composite structure of claim 16, wherein the rigid base structure forms a skin of the aircraft wing, the wing edge, or the wing tip.

18. The composite structure of claim 12, where the at least one cover ply is disposed between overlay plies.

19. The composite structure of claim 12, wherein the rigid base structure forms an outer mold line of the composite structure and the layered cover material forms an inner mold line of the composite structure.

* * * * *